(12) United States Patent
Seth et al.

(10) Patent No.: US 9,315,087 B2
(45) Date of Patent: Apr. 19, 2016

(54) TORSION PROFILE FOR A TWIST BEAM AXLE AND CORRESPONDINGLY EQUIPPED VEHICLE

(71) Applicant: FORD GLOBAL TECHNOLOGIES, LLC, Dearborn, MI (US)

(72) Inventors: Manish Kumar Seth, Cologne (DE); Jens Glorer, Pulheim (DE); Ralf Andreas Schellhaas, Cologne (DE); Andreas Hinz, Frechen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/738,694

(22) Filed: Jun. 12, 2015

(65) Prior Publication Data

US 2015/0360533 A1 Dec. 17, 2015

(30) Foreign Application Priority Data

Jun. 13, 2014 (DE) .......................... 10 2014 211 359

(51) Int. Cl.
*B60G 21/05* (2006.01)
*B21D 47/01* (2006.01)

(52) U.S. Cl.
CPC .............. *B60G 21/051* (2013.01); *B21D 47/01* (2013.01); *B60B 2310/211* (2013.01); *B60G 2200/21* (2013.01); *B60G 2200/23* (2013.01); *B60G 2204/1226* (2013.01); *B60G 2204/1434* (2013.01); *B60G 2206/427* (2013.01)

(58) Field of Classification Search
CPC ............. B60G 21/051; B60G 2200/21; B60G 2204/1434; B60G 2200/23; B60G 2204/1226; B60G 2206/427; B21D 47/01; B60B 2310/211
USPC ..................................... 280/124.166, 124.167
See application file for complete search history.

(56) References Cited

U.S. PATENT DOCUMENTS

| 5,324,073 A | * | 6/1994 | Alatalo | B60G 21/051 228/144 |
| 7,284,765 B1 | * | 10/2007 | Inoue | B60G 21/051 280/124.166 |
| 9,156,329 B2 | * | 10/2015 | Peters | B21D 47/01 |
| 2015/0115564 A1 | * | 4/2015 | Peters | B21D 47/01 280/124.166 |

FOREIGN PATENT DOCUMENTS

| DE | 600 24 313 T2 | 6/2006 |
| DE | 10 2007 022 283 A1 | 11/2008 |

* cited by examiner

*Primary Examiner* — Faye M Fleming
(74) *Attorney, Agent, or Firm* — Jones Robb, PLLC; Raymond L. Coppiellie

(57) ABSTRACT

A torsion profile for a twist beam axle of a vehicle is provided and includes a base body having an open hollow cross section. The body comprises first and second end portions adjacent a central portion and a cross section having first and second limbs connected by a central web portion, the cross section having a U-shape or a V-shape. At least one of the limbs varies in length along the longitudinal axis of at least one of the first and second end portions. At least one of the limbs has a flange arranged on a free end thereof, the variation in length of the at least one limb providing the first and second end portions with a continuously varying cross section along the length of the base body.

14 Claims, 2 Drawing Sheets

TORSION PROFILE FOR A TWIST BEAM AXLE AND CORRESPONDINGLY EQUIPPED VEHICLE

CROSS REFERENCE TO RELATED APPLICATIONS

This application claims priority to German Application No. 10 2014 211 359.8, filed on Jun. 13, 2014, the entire content of which is incorporated by reference herein.

TECHNICAL FIELD

The present disclosure relates generally to a torsion profile for a twist beam axle of a vehicle, and more particularly, to a torsion profile for a twist beam rear axle for a motor vehicle and a twist beam axle for a vehicle.

BACKGROUND

Twist beam axles are configured as part of the wheel suspension of a vehicle, generally as the rear axle. In particular, in motor vehicles they are often combined with a front wheel drive acting on the front wheels. The construction thereof provides two longitudinal rocker arms on which one respective wheel of the vehicle axle is rotatably arranged. The longitudinal rocker arms are connected together in a flexurally rigid manner transversely to a longitudinal axis of the vehicle which lies in the direction of travel of the vehicle. The torsion profile is distorted during the deflection and rebound of one of the longitudinal rocker arms. This permits the simple structural design of a vehicle axle. In this case, the torsion profile simultaneously serves as a transverse anti-roll bar.

The coupling of such a twist beam axle to the structure of a vehicle is implemented by two bearing arrangements. The bearing arrangements are spaced apart from one another in the longitudinal direction of the torsion profile and are generally configured as rubber metal bearings or contain such bearings. The bearing arrangements form a structural rotational axis about which the respective longitudinal rocker arm is able to be pivoted on the vehicle structure.

In order to maintain the required characteristic, generally open hollow cross sections are used as the torsion profile. The open hollow cross sections permit easier rotatability around their respective longitudinal direction relative to closed hollow profiles. Due to the additional function as a transverse anti-roll bar, the design of the torsion profile has considerable influence on the rolling behavior of a vehicle thus equipped. "Rolling" means the tendency of a vehicle to tilt out of the corner when cornering due to the centrifugal force.

Typically, the torsional rigidity of the base body of such a torsion profile may be adjusted by altering its material thickness. This means that the torsional rigidity increases with increasing material thickness. A drawback here is that the weight also increases with increasing material thickness. This also is relevant to the driving safety and driving comfort, as this is an unsprung mass.

Alternatively or in addition, the arrangement of recessed or stamped-out openings through the wall of the base body, for example in the form of holes, has been used to reduce weight around the correspondingly recessed regions. However, the result of such measures is that the stress paths inside the torsion profile may disadvantageously change. In this case it is, in particular, the stresses caused by such openings which are able to concentrate on the edges of the openings. As a result, the risk of possible crack formation is correspondingly increased.

Based on these structures, it is clear that torsion profiles and, in particular, twist beam axles comprising such torsion profiles can be further improved.

SUMMARY

In accordance with various exemplary embodiments of the present disclosure, a torsion profile for a twist beam axle of a vehicle is provided. The torsion profile comprises a base body having first and second end portions with a central portion between the first and second end portions, a length of the base body extending along a longitudinal axis, and an open hollow cross section. The first and second end portions each have a continuously changing cross section along the longitudinal axis. A cross section of the base body has two opposing limbs connected together via a web. The web is shaped as a circular arc which is open toward the limbs. At least one of the limbs varies in length along the longitudinal axis of at least one of the first and second end portions and at least one of the limbs has a flange arranged on a free end thereof, the flange being bent back toward to the associated limb.

In accordance with another aspect of the present disclosure, a torsion profile comprises a base body having an open hollow cross section, the body comprising: first and second end portions adjacent a central portion, and a cross section having first and second limbs connected by a central web portion, the cross section having a U-shape or a V-shape. At least one of the limbs varies in length along the longitudinal axis of at least one of the first and second end portions and at least one of the limbs has a flange arranged on a free end thereof. The variation in length of the at least one limb provides the first and second end portions with a continuously varying cross section along the length of the base body.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
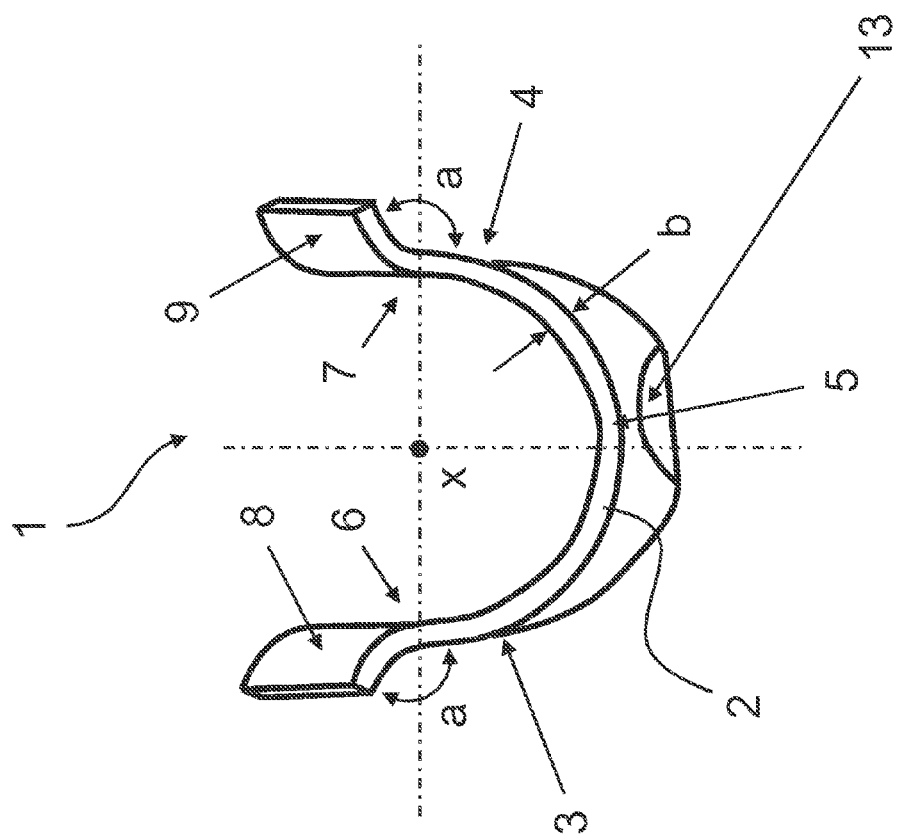
FIG. 1 shows a cross section through a torsion profile according to the disclosure and FIG. 2 shows the torsion profile of FIG. 1 in a side view.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a torsion profile for a twist beam axle of a vehicle is disclosed. The disclosed torsion profile for a twist beam axle and twist beam axle comprising a torsion profile include certain advantages over conventional axles. For example, the disclosed twist beam axles have a sufficiently high torsional rigidity in spite of low material thickness and correspondingly low weight. The torsion profile comprises a base body which extends in a longitudinal direction and which has an open hollow cross section. In this case, it may be, for example, of U-shaped or V-shaped cross section.

According to the present disclosure, the base body has a central portion as well as two end portions relative to its longitudinal extent (i.e., length). The individual portions are arranged here such that the two end portions respectively extend between one of the ends of the base body and the central portion. In other words, the base body—proceeding from one of its ends—is made up of the first end portion, followed by the central portion and then the second and thus the last end portion. In this case, in particular, the two end portions each have a continuously changing cross section along the longitudinal extent of the base body, in the direction X shown in FIG. 2. This means that the design of each of the end portions varies continuously along its length from its end to the central portion.

In one exemplary embodiment, the continuously altering cross section of the two end portions may produce a continuously varying cross-sectional shape along a length of the base body.

Taken in cross section, the base body has two opposing limbs. This is, for example, the case in a U-shaped or V-shaped embodiment of the profile cross section. In this case, the two limbs may be connected together via a web. The web connecting together the two limbs may have the shape of a circular arc which is open toward the limbs. As a result, a substantially U-shaped cross section is achieved with the web providing a corresponding rounded portion between the two limbs.

Due to the circular-arc shape of the web, sudden changes of direction or even interruptions in the cross-sectional path of the base body are avoided, which has an advantageous effect on the path of the stresses inside the wall of the torsion profile. This refers, in particular, to edges or corners which otherwise cause stresses in a disadvantageous manner and which locally may lead to high loads with corresponding damage, such as for example crack formation.

In one exemplary embodiment, the transition between the web and the two limbs attached thereto may be designed such that a sudden change of direction or even an interruption is not present in the cross-sectional path of the base body.

The present disclosure further provides that at least one of the two limbs may have a length which changes over the longitudinal extent of at least one of the end portions. Accordingly, the continuous cross-sectional alteration of at least one end portion may amount to nothing more than at least one of its limbs having an increasing length from the central portion. The length also may alternate in the longitudinal direction so that, for example, the length increases and then decreases again. In accordance with one exemplary embodiment, the changing length in a side view of the base body may describe or at least suggest an S-shape. Accordingly, at least one reversal point or a flattened portion might be produced in the longitudinal direction of the associated end portion. Advantageously, both limbs of at least one end portion of the base body have a changing length. In one exemplary embodiment, the two limbs have a length which changes to the same extent. In particular, the lengths of the two respective limbs of both end portions may vary so that the end portions are able to have the same characteristic relative to their torsional rigidity.

Moreover, at least one of the limbs in the region of at least one of the end portions has a flange arranged at its free end. The flange also may extend into the central portion or even reach the opposing end portion of the base body. In this case, the flange may be bent back toward the associated limb.

By means of the bent-back flange, the stress paths inside the torsion profile are advantageously altered, providing an advantageous effect on any stress peaks. This refers, in particular, to the edges of the limbs located at the free ends of the limbs, which extend in the longitudinal direction. Any stresses which occur during use of the torsion profile are concentrated on these limbs. For this reason, for example, these limbs have to be designed to be correspondingly thickened, in order to prevent any potential crack formation.

In accordance with the present teachings, the disclosed permits a torsion profile of small dimensions which at the same time has the required torsional rigidity. These characteristics are attributable to the continuously changing cross section of the end portions of the base body, by which the torsional rigidity may be precisely set over the length in the longitudinal direction of the end portions of the base body. As a result, the rolling behavior of a vehicle equipped with an axle having such a profile may be advantageously adapted relative to the required roll stiffness, for example by the changing profile shape of the torsion profile.

As the torsion profile of the present disclosure does not require an increase in the material thickness of the torsion profile to reach the required torsional rigidity, the torsion profile according to the present teachings has a correspondingly advantageous lower weight.

In accordance with another exemplary embodiment, the changing cross-sectional design of the end portions at each respective end of the base body begins in the direction of the central portion and in this case has a transition thereto. "Transition", for example, is understood to be a suitable rounded portion between the central portion and the respective end portion.

Relative to the lengths of the central portion and the two end portions, it is provided that the lengths may each take up a third relative to the overall length of the base body. In one exemplary embodiment, the central portion takes up 10% to 20% of the overall length of the base body, whereas the corresponding remaining 90% to 80% of the overall length of the base body is divided up into the two end portions. In one exemplary embodiment, the two end portions have an identical length in the longitudinal direction X (see FIG. 2).

In another exemplary embodiment, the central portion of the base body may be reduced to a quasi imaginary portion between the two end portions, such that the central portion of the base body only represents a transition plane between the two end portions.

By means of the arrangement of the flange on at least one of the limbs, the stresses which occur are advantageously deflected. This means that the stresses may be deflected and/or displaced away from the edges to the center; relative to the profile base. Due to the displacement of the stresses, the risk of crack formation (which typically occurs on the otherwise straight edges of the conventional torsion profile) is consequently reduced.

According to one exemplary embodiment of the torsion profile, both limbs of at least one end portion of the base body may have flanges arranged at their free ends. In another exemplary embodiment, the limbs of both end portions of the base body may have flanges at the end. The flanges may be bent back relative to the respectively associated limb, that is, bent back toward the respective limb, where the flanges are oriented so as to face away from one another. As a result, the advantageous displacement of the stresses which occur into the center of the base body of the torsion profile is improved.

The cross-sectional alteration of the end portions of the base body also may be limited to a variation of the end flanges in order to set the required roll stiffness. For example, the angle a enclosed between the respective flange and its associated limb may be varied along the length of the base body in the direction X. Alternatively or additionally, the length of at least one flange also may vary relative to the cross section of the base body in the longitudinal direction X. A combination of the above-mentioned variations including varying the length of the limb(s) is also possible, as already set forth above.

The present disclosure provides that the base body is able to have a uniform material thickness. Thus, the adjustment of the required roll stiffness would be based solely on the variation of the cross-sectional shape of the base body in accordance with the present teachings. The base body or parts of the base body may, for example, be a correspondingly edged and/or shaped metal plate. If required, the wall of the base body also may have different material thicknesses as may be achieved, for example, when using a sheet metal plate in the form of a tailored blank.

Even when the two end portions are able to have different lengths and/or different cross-sectional paths, the present disclosure may provide the same design for each. Thus, the two end portions of the base body may be configured to be mirror images of one another relative to a mirror plane perpendicular to the longitudinal axis X of the base body and dividing the central portion equally. In this manner, a uniform behavior of the torsion profile may be achieved relative to its rotation.

In accordance with one exemplary embodiment of the present disclosure, the base body is a single component which is configured in one piece and made of a single material. In other words, for producing the torsion profile a single semi-finished product such as a sheet metal plate may be used which, by suitable shaping measures, achieves the design according to the present teachings.

The torsion profile according to the disclosure set forth above for a twist beam axle of a vehicle makes a significant contribution to the fact that the twist beam axle has a sufficiently high torsional rigidity in spite of low material thickness and correspondingly low weight. Due to the variation of the profile cross section in accordance with the present disclosure, the required torsional rigidity may be simply set by the respective cross-sectional and profile shape. In particular, in combination with the flanges arranged on the limbs of the base body, additionally the stresses are reduced on the edges of the limbs, by the stresses being shifted into the center—relative to the longitudinal direction of the torsion profile. Therefore, this results in a torsion profile which as a whole is lightweight and hard-wearing relative to possible damage by the formation of cracks and which, relative to the conventional profiles, advantageously saves weight in spite of being made of the same material.

The present disclosure further relates to a twist beam axle for a vehicle comprising a torsion profile which is suitable, in particular, as a rear axle for a vehicle. Advantageously, the torsion profile used is a torsion profile according to the present disclosure as described above. The twist beam axle according to the present disclosure may be combined with a front wheel drive in a vehicle, in particular in a motor vehicle.

The torsion profile of the twist beam axle according to the disclosure has a base body which extends in a longitudinal direction of the torsion profile and which has an open hollow cross section. In this case, for example, it may be of U-shaped or V-shaped cross section. According to the disclosure the base body—relative to its longitudinal direction—has a central portion as well as two end portions. In this case, the two end portions respectively extend between one of the ends and the central portion. According to the disclosure, the respective end portions have a continuously changing cross section in the longitudinal direction of the base body.

Furthermore, the base body relative to its cross section has two opposing limbs which are connected together via a web. In this case the web has the shape of a circular arc which is open toward the limbs. At least one of the limbs has a length changing over the longitudinal direction of at least one of the end portions. Additionally, at least one of the limbs in the region of at least one of the end portions has a flange arranged at its free end. The flange in this case is bent back relative to the associated limb.

Turning now to the drawings, a sectional view of a torsion profile 1 in accordance with the present disclosure is illustrated in FIG. 1. Such a torsion profile may be used for a twist beam axle (not shown). The torsion profile 1 comprises a base body 2 which has an open hollow cross section. As may be seen, the base body 2 has a substantially U-shaped cross section. With reference to the view of FIG. 1, the cross section of the base body 2 is open at the top.

The base body 2 has, relative to its cross section, two limbs 3, 4 opposing one another. The two limbs 3, 4 are connected together via a web 5. In this case, the web 5 has the shape of a circular arc open toward the limbs 3, 4. In this manner, the web 5 is curved around a longitudinal direction x of the torsion profile and/or the base body 2.

Both limbs 3, 4 have flanges 8, 9 arranged at their free ends 6, 7. The flanges 8, 9 are bent back relative to the respectively associated limbs 3, 4, (i.e., are bent back toward the limbs) so that the limbs enclose an angle a therebetween. As may be seen, the two flanges 8, 9 are designed so that they face away from one another. The base body 2 has a uniform material thickness b, wherein the base body 2 is configured in one piece and is made of a single material.

Figure 2:
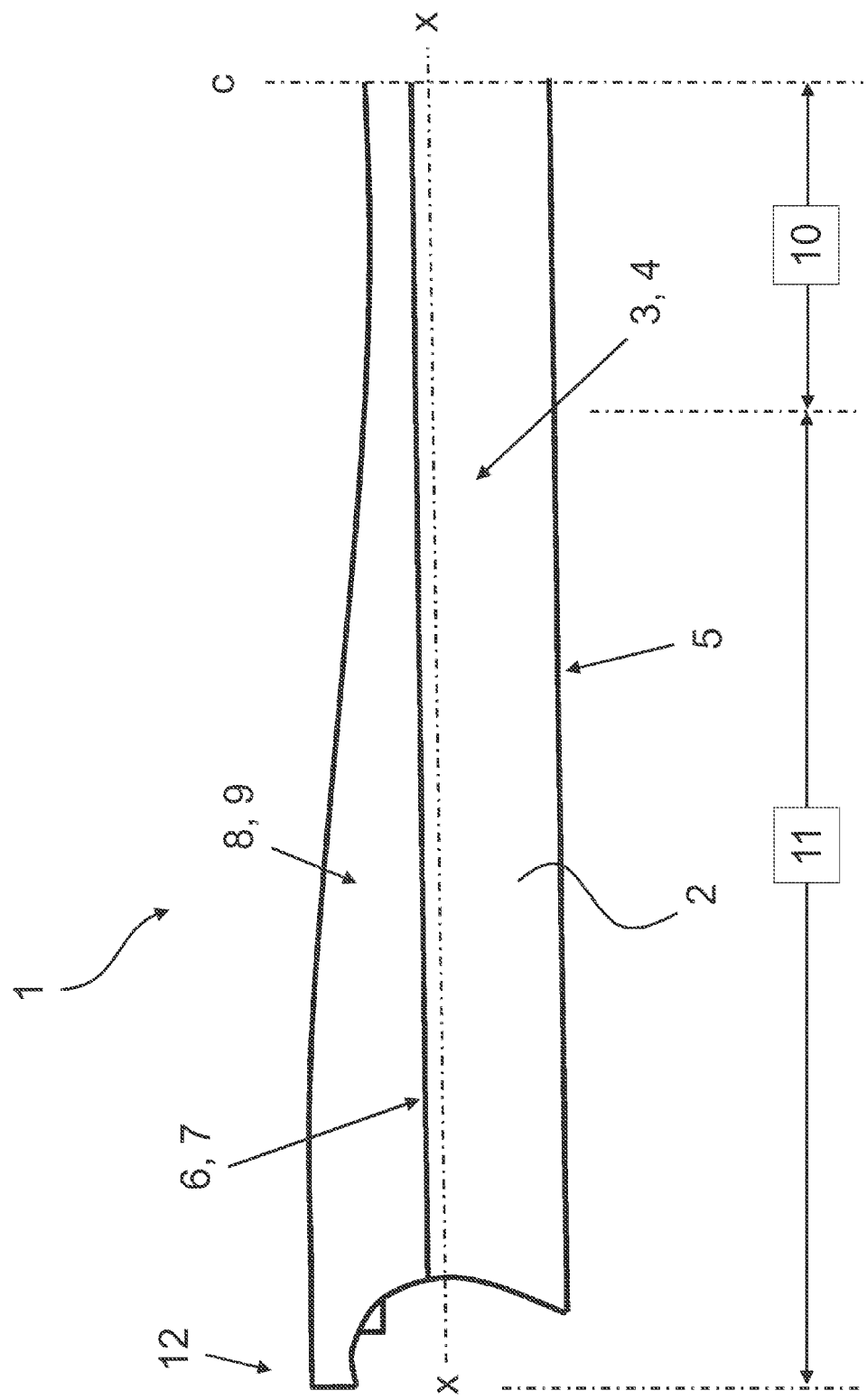

FIG. 2 shows the torsion profile 1 of FIG. 1 in a side view. For reasons of clarity the torsion profile is not shown in its entire length extending in the longitudinal direction X but is reduced by half. The view is divided along a mirror plane C, which may extend substantially perpendicular to the longitudinal direction X, depending on the cross-sectional path.

The base body 2, shown here in half, has a central portion 10 and two end portions 11 relative to its longitudinal direction X, wherein only one of the two end portions 11 is shown. The end portions 11 each extend between one of the respective ends 12 of the base body 2 and the central portion 10. At the end 12 of base body 2 shown in FIG. 2, the base body is recessed such that it is able to be connected to a longitudinal rocker arm (not shown). As illustrated, the end portion 11 has a continuously changing cross section in the longitudinal direction X. In other words, the cross-sectional shape of the base body 2 continuously changes, at least in the region of the end portion 11, along the length of the base body 2. The end portion 11 also represents the other end portion, not shown. In this regard, the two end portions 11 of the base body 2 are designed to be mirror images of one another, relative to the mirror plane C dividing the central portion 10 of base body 2.

FIG. 1 also shows an optional reinforcement element 13. The optional reinforcement element 13 may increase the service life of the torsion profile 1, where the reinforcement element 13 also may optionally serve for adjustment purposes, for example with regard to the torsional rigidity. Additionally, the reinforcement element 13 may be gripped in order to handle, i.e., to machine, the torsion profile 1. For example, for welding purposes, the torsion profile 1 may be gripped if the torsion profile 1 is intended to be connected to other elements. For example, the reinforcement element 13 may be arranged on the central portion 10 of the base body 2 and/or on one or both end portions 11 of the base body 2. The reinforcement element 13 may be arranged in a continuous or interrupted manner along the longitudinal extent of the torsion profile 1 or only partially on the torsion profile 1. The reinforcement element 13 encompasses the base body 2, as shown in FIG. 1, on an outer face of the web 5 and terminates, for example, before the bent-back portion of the flanges 8, 9 on the limbs 3, 4. It also is possible to remove the reinforcement element 13 again if the torsion profile 1 is connected to the desired component.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A torsion profile for a twist beam axle of a vehicle, comprising:
a base body having first and second end portions with a central portion between the first and second end portions, a length of the base body extending along a longitudinal axis, and an open hollow cross section, wherein the first and second end portions each have a continuously changing cross section along the longitudinal axis, wherein a cross section of the base body has two opposing limbs connected together via a web, the web shaped as a circular arc which is open toward the limbs, wherein at least one of the limbs varies in length along the longitudinal axis of at least one of the first and second end portions and at least one of the limbs has a flange arranged on a free end thereof, the flange being bent back toward to the associated limb.

2. The torsion profile as claimed in claim 1, wherein both limbs have flanges arranged at respective free ends of the limbs, wherein each flange is bent back toward the respectively associated limb, the flanges being oriented so as to face away from one another.

3. The torsion profile as claimed in claim 1, wherein the base body has a uniform material thickness.

4. The torsion profile as claimed in claim 1, wherein the first and second end portions of the base body are mirror images of one another about a mirror plane extending perpendicularly to the longitudinal axis and dividing the central portion equally.

5. The torsion profile as claimed in claim 1, wherein the base body is one piece and made of a single material.

6. A twist beam axle for a vehicle comprising a torsion profile as claimed in claim 1.

7. A vehicle having a twist beam axle comprising a torsion profile as claimed in claim 1.

8. A torsion profile for a twist beam axle of a vehicle, comprising:
a base body having an open hollow cross section, the body comprising:
first and second end portions adjacent a central portion; and
a cross section having first and second limbs connected by a central web portion, the cross section having a U-shape or a V-shape;
wherein at least one of the limbs varies in length along the longitudinal axis of at least one of the first and second end portions and at least one of the limbs has a flange arranged on a free end thereof, the variation in length of the at least one limb providing the first and second end portions with a continuously varying cross section along the length of the base body.

9. The torsion profile as claimed in claim 8, wherein each of the limbs includes a flange arranged on a respective fee end thereof.

10. The torsion profile as claimed in claim 9, wherein the flanges are oriented to face away from one another.

11. The torsion profile as claimed in claim 10, wherein each flange is bent back toward the respectively associated limb.

12. The torsion profile as claimed in claim 10, wherein each flange defines an angle with respect to the associated respective limb.

13. The torsion profile as claimed in claim 8, wherein the base body has a uniform material thickness.

14. A vehicle having a twist beam axle comprising a torsion profile as claimed in claim 8.

* * * * *